United States Patent [19]

Pavlecka et al.

[11] 4,114,837
[45] Sep. 19, 1978

[54] AIR TRANSPORT AND LIFTING VEHICLE

[75] Inventors: Vladimir H. Pavlecka, Newport Beach, Calif.; David G. McIntyre, Mount Vernon, Wash.

[73] Assignee: Skagit Corporation, Sedro Woolley, Wash.

[21] Appl. No.: 780,933

[22] Filed: Mar. 24, 1977

[51] Int. Cl.² .............................................. B64B 1/34
[52] U.S. Cl. ........................................ 244/26; 244/2; 244/125
[58] Field of Search ................. 244/12.2, 2, 26, 23 C, 244/5, 97, 96, 125, 128, 29, 30, 115, 12.1, 12.3, 12.4, 23 B, 23 A

[56] References Cited

U.S. PATENT DOCUMENTS

| 688,584 | 12/1901 | Botts | 244/26 |
|---|---|---|---|
| 1,682,405 | 8/1928 | Naatz | 244/30 |
| 1,795,335 | 3/1931 | Hall | 244/97 |
| 1,797,502 | 3/1931 | Hall | 244/97 |
| 1,806,655 | 5/1931 | Traver | 244/115 |
| 2,081,381 | 5/1937 | Oehmichen | 244/26 |
| 2,762,584 | 9/1956 | Price | 244/12.4 |
| 3,083,934 | 4/1963 | Vanderlip | 244/5 |
| 3,253,805 | 5/1966 | Taylor | 244/12.2 |
| 3,450,374 | 6/1969 | Moore | 244/5 |
| 3,993,268 | 11/1976 | Moore | 244/26 |

FOREIGN PATENT DOCUMENTS

| 909,466 | 10/1962 | United Kingdom | 244/23 C |
|---|---|---|---|
| 770,875 | 3/1957 | United Kingdom | 244/23 C |

Primary Examiner—Galen L. Barefoot
Attorney, Agent, or Firm—Robert C. Smith

[57] ABSTRACT

An air lifting vehicle includes, inter alia, a main frame containing an engine, a helicopter-type rotor driven by the engine, a rear located propeller which provides torque compensation for the rotor as well as yaw control for the vehicle, and a pilot's cabin. Attached to the frame through a plurality of outwardly extending truss members is a keel structure which includes a circular truss section essentially coaxial with and positioned above the rotor and other generally triangular or rounded triangular truss sections attached fore and aft of the circular truss section. Balloon members including fore and aft generally triangular Forlanini envelope sections are secured to the keel and laced together at the center to define a circular opening or duct above the rotor. A pair of forward thrusting propellers are driven by an auxiliary engine carried in the frame and are gimbaled in the elevational plane for pitch control of the vehicle. A pair of inflatable air ballonets is carried in each envelope section which are independently inflatable and deflatable to assist in pitch control. They also progressively deflate at increasing altitude to permit the lighter-than-air gas in the envelopes to expand. Suitable landing wheels and an air cushion pad are provided for landing and for supporting the vehicle on the ground. A second embodiment having a much larger payload includes a pair of fore and aft positioned rotor and engine units with corresponding circular openings in the envelope structure serving as ducts for the rotors.

14 Claims, 8 Drawing Figures

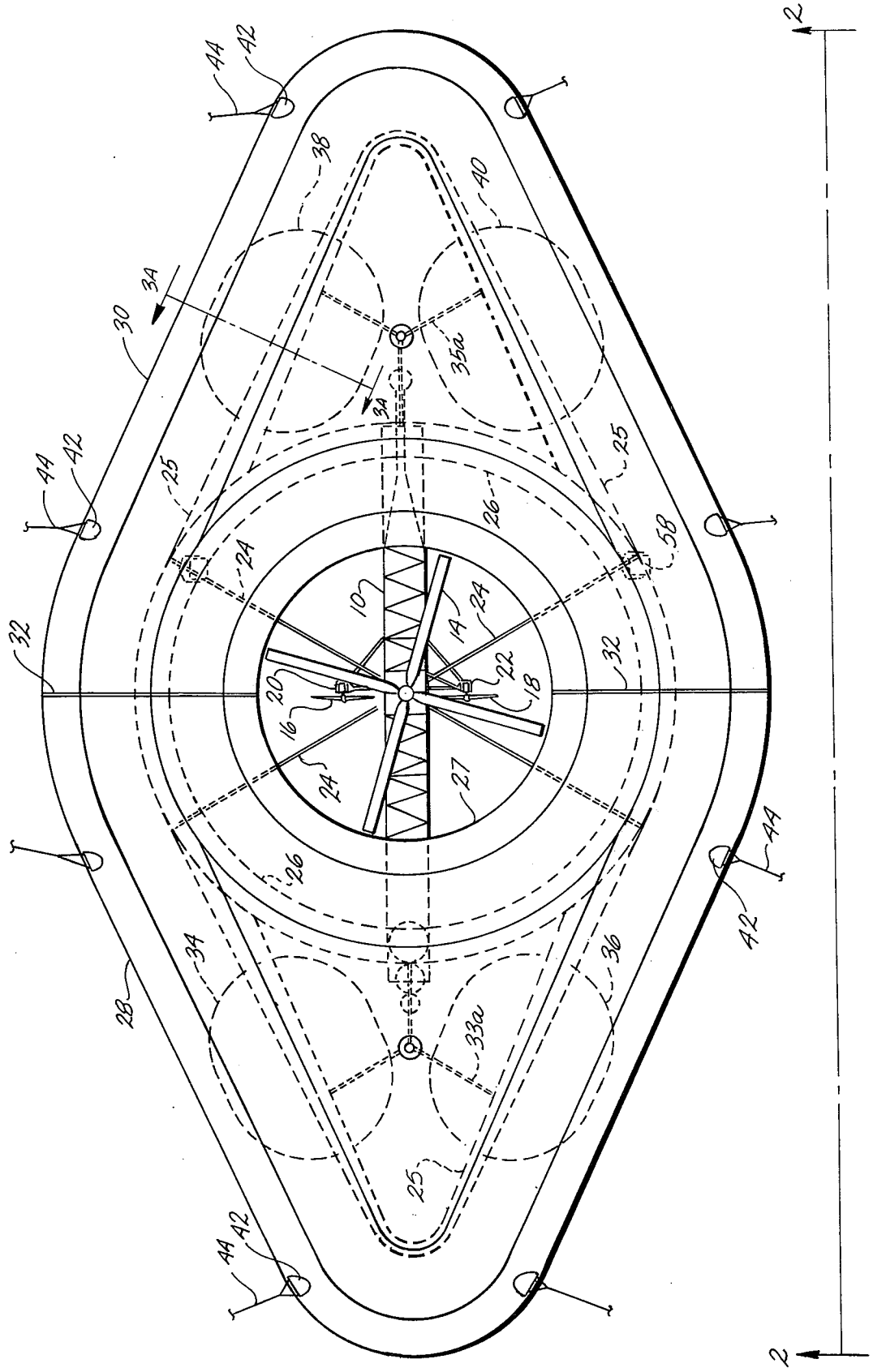

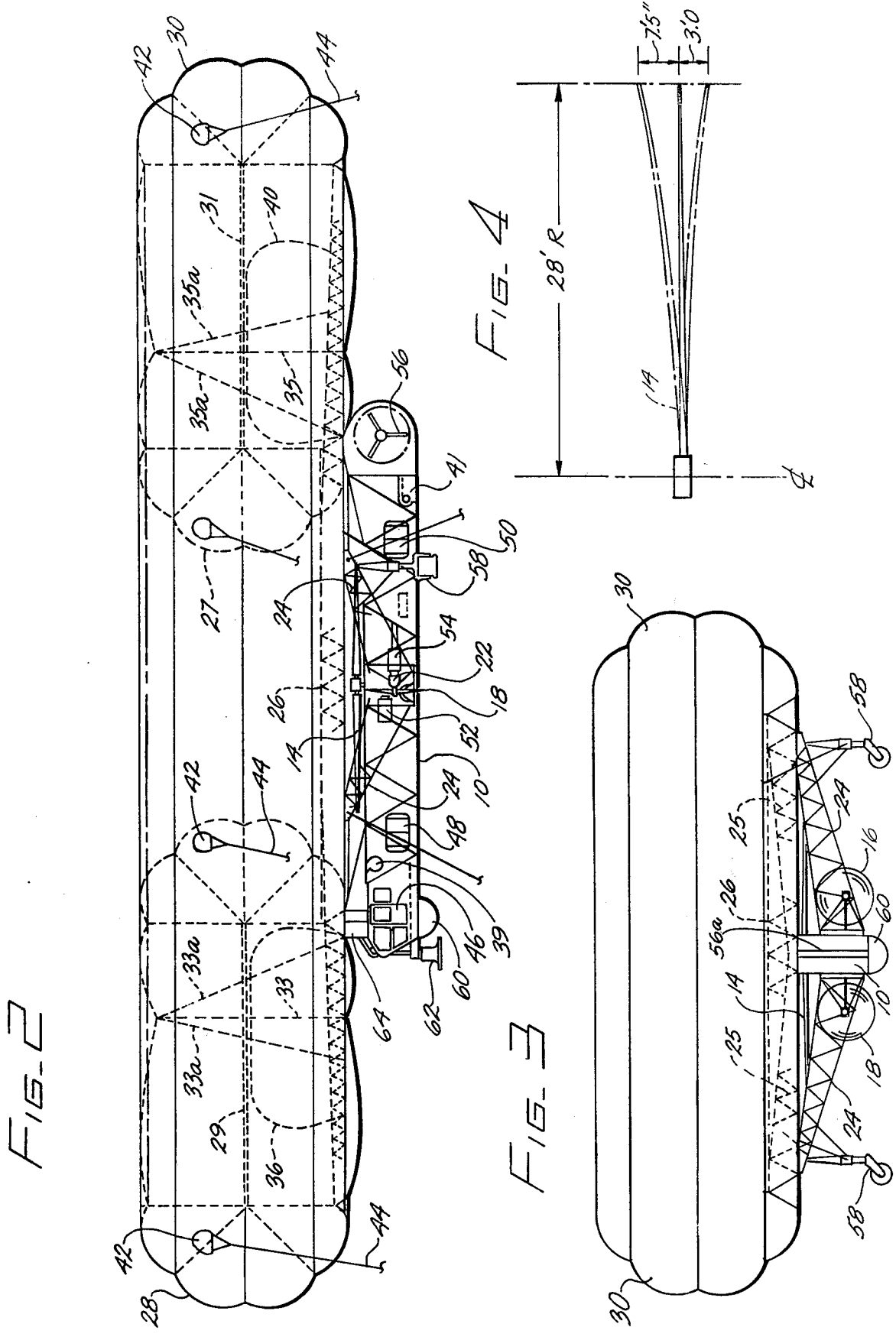

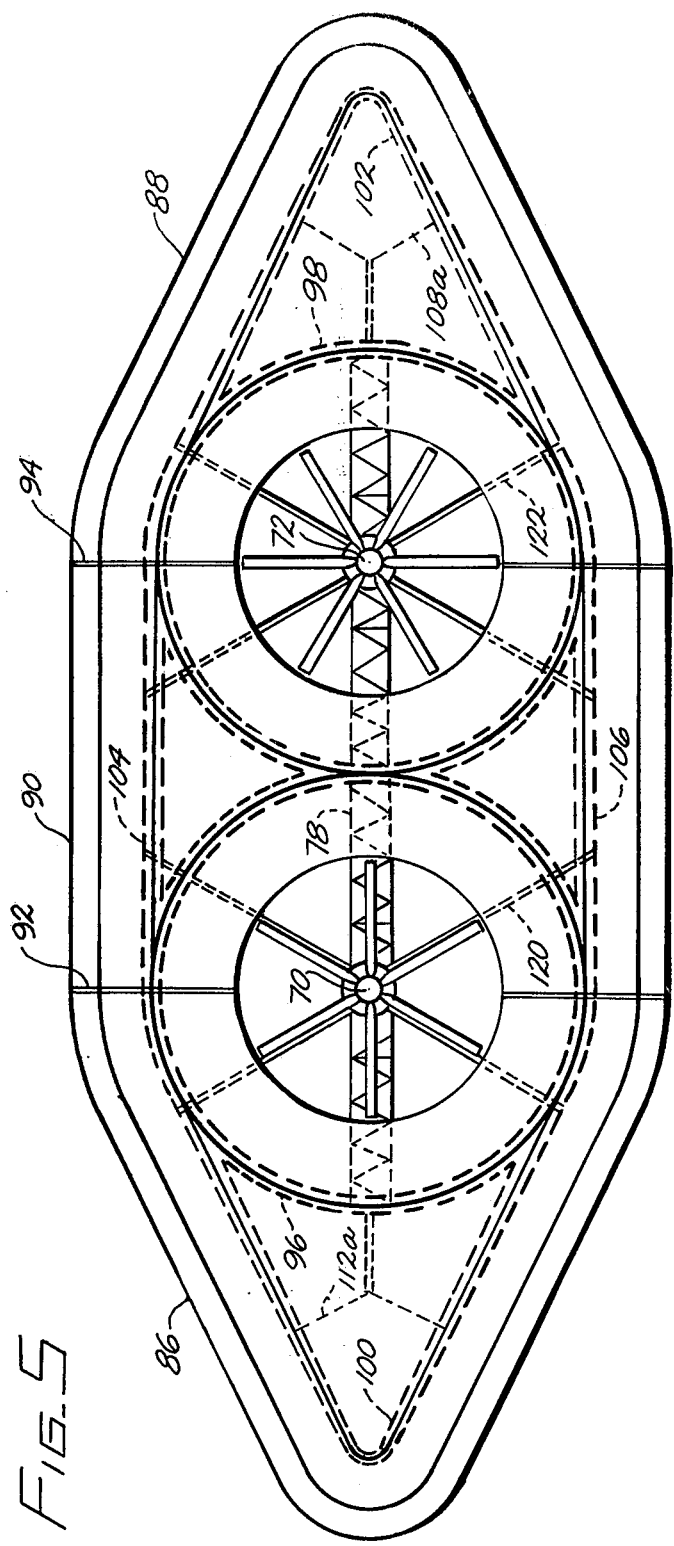
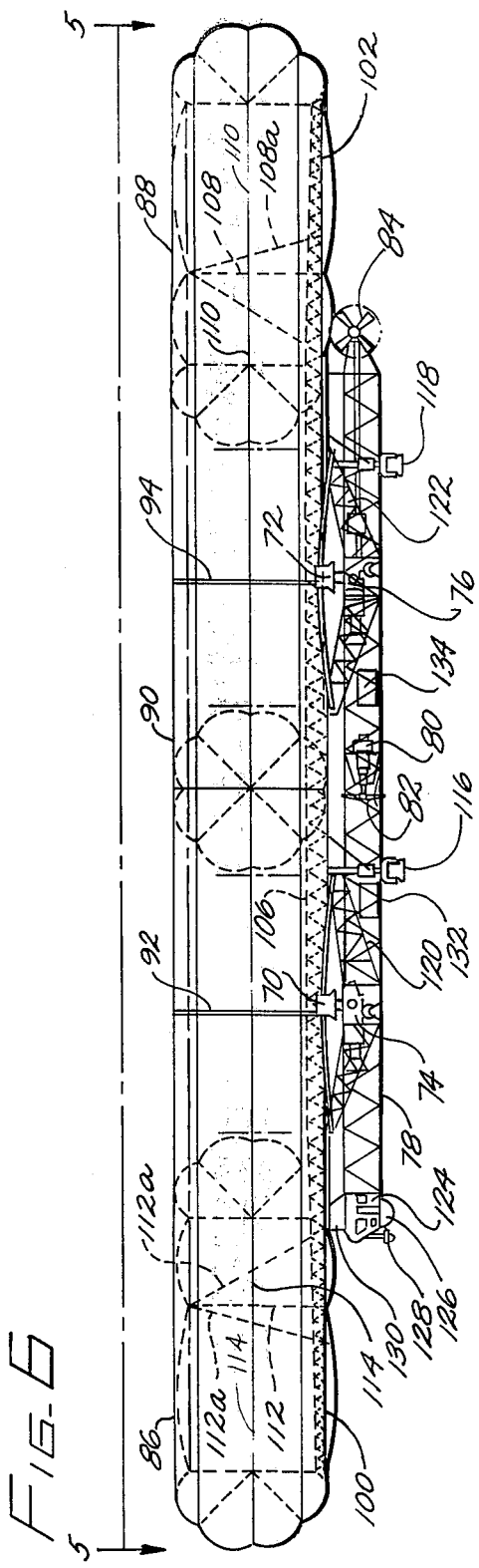

AIR TRANSPORT AND LIFTING VEHICLE

BACKGROUND OF THE INVENTION

Helicopters have become quite useful and reliable as specialized lifting vehicles and have been used for construction projects, hauling freight for short distances and, to a limited extent, for lifting fallen logs out of the forest, particularly where there are not convenient logging roads. Recent interest in minimizing damage to the environment has made it particularly of interest to avoid creating excessive numbers of logging roads or damaging the terrain or adjacent trees by hauling the fallen logs out of the woods as by tractors or skidder-type vehicles. While helicopters can be used for this purpose, they are quite expensive to operate and have a limited payload, making their use economically marginal at best. For this reason, tethered balloons have been tried with some limited success. Balloons, of course, suffer somewhat from lack of controllability and long lines or cables are required for tethering. Applicants are aware of designs in which lighter-than-air structures are associated with helicopters to improve the payload, one such design being the subject of U.S. Pat. No. 3,083,934. To the knowledge of applicants, no such designs have resulted in commercially acceptable aircraft. With the recent substantial increases in the price of fuel, there is now considerable need for an airborne cargo carrier which can carry substantial loads at reasonable speeds with reasonable fuel costs, controllability, and safety.

SUMMARY OF THE INVENTION

Applicants have attempted to meet the need described above by means of providing an airborne cargo vehicle which is reasonably economical to operate, which can carry a substantial payload and which is neither particularly difficult to control nor dangerous to operate. Basic helicopter components are carried on or within a frame including the engine, rotor, gearbox for the rotor, and a torque-compensating propeller which also provides yaw control. In addition, our vehicle carries a large keel member which supports an inflatable envelope structure carrying a lighter-than-air gas. This keel structure includes a circular center truss member which is coaxial with and above the rotor and additional fore and aft truss members which define a generally diamond or ellipsoidal configuration. The inflatable fore and aft envelope members are supported on the keel and are of essentially the same shape as the keel, cooperating to form a circular center opening over the rotor serving as a duct therefor. A pair of forward thrusting propellers which are preferably driven by an auxiliary engine provide a means for assuring that the vehicle moves forward at a significant rate. These propellers are gimbaled in the elevational plane to provide a means of pitch control for the vehicle. Additional pitch control means is provided by forward and aft air ballonets carried within the inflatable envelopes and which are automatically inflated and deflated to vary the proportional amounts of lighter-than-air gas in the forward or rear envelopes.

A larger embodiment includes two rotor sets arranged fore and aft with the keel having two circular truss members coaxial with the rotor sets and envelope members carried on the keel ahead of and behind the rotor openings and with a third envelope member positioned between the rotors which cooperates with the first two envelope members to define a pair of circular openings or ducts above each rotor set. This larger vehicle is otherwise very similar to the single rotor vehicle described above. Both types of vehicles carry suitable landing gear, preferably including low pressure tires mounted on wheels extending from struts attached to radial truss members extending from the main frame to the keel plus an inflatable pad at the forward end of the main frame under the preferred location for the pilot's or operator's cabin. A winch carried at the forward end of the frame is operable to lower a landing cone at the end of a cable which is placed in position in a pylon by a ground crew member. The vehicle can then be brought to the ground by reeling in on the cable.

BRIEF DESCRIPTION OF THE DRAWINGS

FIG. 1 is a plan view of an airborne cargo vehicle incorporating our invention;

FIG. 2 is a side view of the vehicle shown in FIG. 1;

FIG. 3 is a partial rear view of the vehicle shown in FIGS. 1 and 2;

FIG. 4 is an enlarged diagrammatic view of one side of the helicopter rotor shown in FIGS. 1 and 2;

FIG. 5 is a plan view of a cargo vehicle constituting a second embodiment of our invention;

FIG. 6 is a side view of the vehicle shown in FIG. 5;

DESCRIPTION OF THE PREFERRED EMBODIMENT

Figure 7:
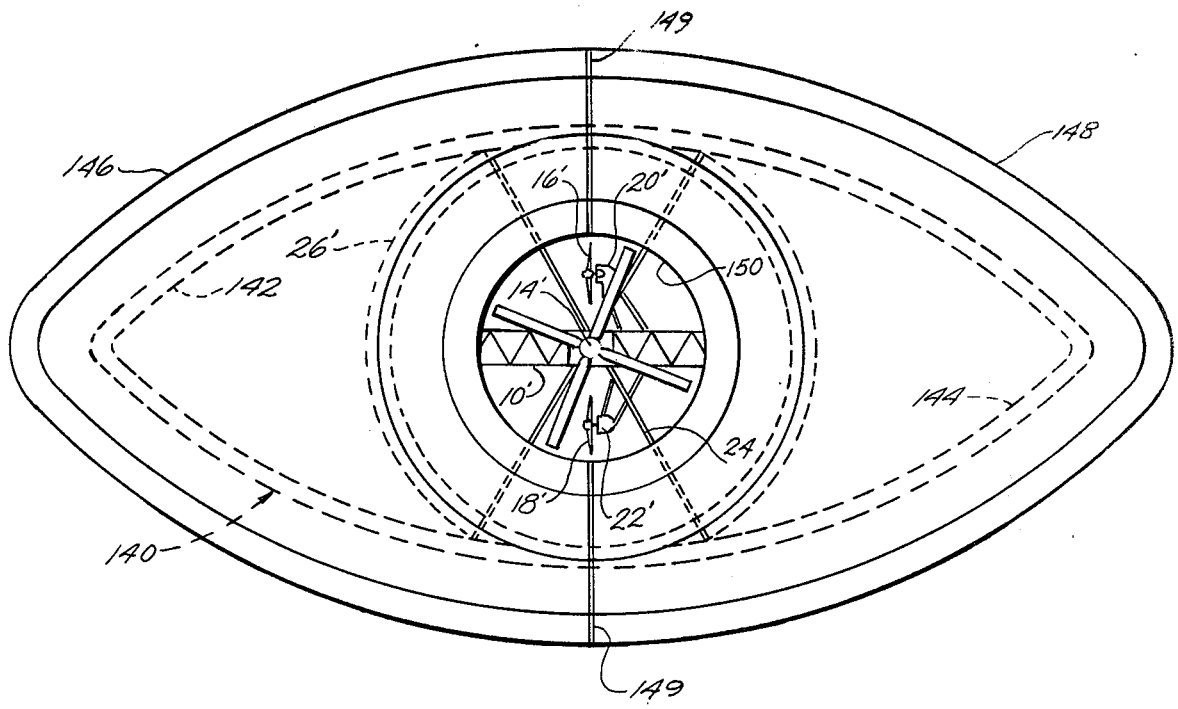
FIG. 7 is a plan view of an additional embodiment of our invention.

Referring now to FIG. 1, which is a plan or top view of an embodiment of our invention, a frame structure 10 which may be of welded steel tubing supports a prime mover (shown in FIG. 2) which may be a Pratt and Whitney TWIN PAC PT67-6 gas turbine engine driving a main rotor 14 and an accompanying gearbox, which may be a Sikorsky S58T Mark II rotor and gearbox. Also attached to the frame 10 and located at the sides thereof are a pair of forward thrusting propellers 16, 18 which are driven from gearboxes 20, 22, respectively, which may be driven from a second prime mover. Alternatively these propellers and gearboxes may be driven from separate individual power units. These propeller units are gimbaled in the pitch plane such that they may be directed up or down to cause the vehicle to climb or descend. Extending radially outwardly and upwardly from the frame 10 are a plurality of truss members 24 which are attached to and support a keel 25 which is generally diamond-shaped but which also includes a centrally located circular truss portion 26. The keel structure 25, 26, which diminishes in depth toward the forward and rear ends of the vehicle, provides support for a pair of large volume inflatable fabric envelopes 28, 30 which are laced or otherwise fastened together along a line 32 at the center of the vehicle in order to provide a buoyant structure which, when inflated with a lighter-than-air gas, such as helium, will provide an amount of lift which is preferably just short of that required to neutralize the weight of the helicopter and keel structures. This leaves almost the entire lifting capability of the helicopter engine and rotor available to lift the payload. With the envelopes laced together as shown, a circular opening 27 is formed above rotor 14 and generally coaxial therewith to form a ducted fan arrangement. Additional support for circular truss member 26 is provided at the fore and aft ends of frame 10.

Carried within each of envelope sections 28 and 30 are ballonets 34 and 36 in envelope 28 and ballonets 38 and 40 in envelope 30. The forward and aft pairs of ballonets are inflatable in pairs to assist in altitude control and for compensation for the expansion of the lifting gas at altitude.

Automatic means, not shown, are used to control the supply of air from a pair of hydrostatically driven blowers 39 or 41 (FIG. 2) which are used to provide air to the ballonets. Also, pressure-responsive valve means are incorporated which will respond to the inflation of one pair of ballonets and the corresponding reduction in air pressure in the opposite pair to permit the lifting gas to flow from the envelope in which ballonet air pressure is increasing toward the envelope in which ballonet air pressure is decreasing. This will cause the vehicle to have greater lift at one end or the other, thus varying its attitude as for climbing or landing. The envelope of this vehicle, as shown, is based on the Forlanini envelope for semirigid airships featuring multilobed envelope sections, each lobe being of relatively small radius. The advantage of the small radius of the lobe is in decreasing the tension in the fabric caused by internal gas pressure and in making the envelope contour more resistant to the external pressures; for example, those due to forward travel.

The higher fabric rigidity of the Forlanini type will result in a higher ratio of bending moments supported by the fabric envelope to bending moments supported by the keel than would be the case where the envelope is of a more conventional type.

Within the envelope sections 28 and 30 are a pair of equatorial internal fabric inserts 29 and 31, respectively, in the triangular part of the envelope which provide constraint against internal pressure forces on the envelope fabric containing the lighter-than-air gas. This internal fabric element is not gas-tight because it does not form a boundary of a gas compartment.

Also contained within envelopes 28 and 30 are a plurality of lifting ropes which are preferably anchored at a common point at the top of envelopes 28 and 30 and which extend downwardly through the interior of the envelopes and through the equatorial fabric members 29 and 31 to fasten to the keel 25. The vertical ropes 33, 35 have as their primary functions to restrain the envelope from ballooning upwardly such that the generally diamond torus configuration is retained. The diagonal internal ropes 33a and 35a are also preferably of a very strong but light fiber material such as Kevlar, are fastened to the keel, and provide the function of helping to transfer the lifting forces from the envelopes 28 and 30 to the keel 25 and, hence, to the entire vehicle. Fastened to envelope members 28 and 30 are a plurality of mounting means 42 and corresponding tiedown ropes 44 for tying the vehicle to ground anchors when not in flight.

FIG. 2 is a side view of the vehicle shown in FIG. 1. In this view the frame structure 10 is shown supporting an operator or pilot's cabin 46, fore and aft fuel tanks 48 and 50, a large gas turbine engine 52 for driving the gearbox and main rotor 14, a smaller gas turbine engine 54 for driving the forward thrusting propellers 18 and gearbox 22, and the torque-compensating propeller 56 which also serves as a yaw control means. Engine 52 will normally supply the power for the hydrostatically driven blowers 39 and 41. Propellers 18 and 56 will preferably include pitch changing means such that they may be operated at nearly constant speed and can vary their output through variation in pitch angle. Also, while rotor 14 has been shown as having a single four-blade arrangement, it can also be made to include more than one rotor or two blades on one or two rotors. The rotor 14 should include pitch changing means which will permit a reversing of torque to permit the pilot to descend at some desired rate when the vehicle is unloaded. It will be recognized that the fuel load on a vehicle of the type described may be quite significant, and if the buoyancy is at a high level when there is no load and little fuel aboard, the vehicle may tend to descend quite slowly unless the pilot can reverse the thrust on the main rotor 14. Controls are also provided for pitch control of the blades to control the vehicle in the roll plane, as in conventional helicopter practice.

It was suggested above that the large gas turbine driving the rotor 14 may be a twin type gas turbine engine having two separate engine units. This affords the possibility of using both engine units when carrying a load and of shutting one of the engines down when running unloaded to conserve fuel.

Supported on the truss members 24 are a pair of castering wheels with low pressure tires 58 which cooperate with a pneumatic bag or pad 60 to provide support for the vehicle when on the ground. Immediately ahead of the pilot's cabin 46 an anchoring cone 62 is secured to the frame 10 and is reeled in and out by means of a hoist 64 located over the pilot's cabin. During landing the cone is reeled out 100 feet or more where it is caught by a crewman on the ground who places it in a pylon. Winding in on the hoist 64 will bring the vehicle down to a position adjacent the pylon. After the vehicle reaches this position the tie-down ropes 44 are fastened to suitable anchors on the ground.

FIG. 3 is a partial rear view of the vehicle of FIGS. 1 and 2. Visible in this view are the envelope half 30, keel structure 25 with center truss 26, frame 10, propellers 16 and 18, truss members 24, the castering wheels 58 and the pneumatic bag 60. The yaw control propeller housing is shown at numeral 56a.

Figure 3A:
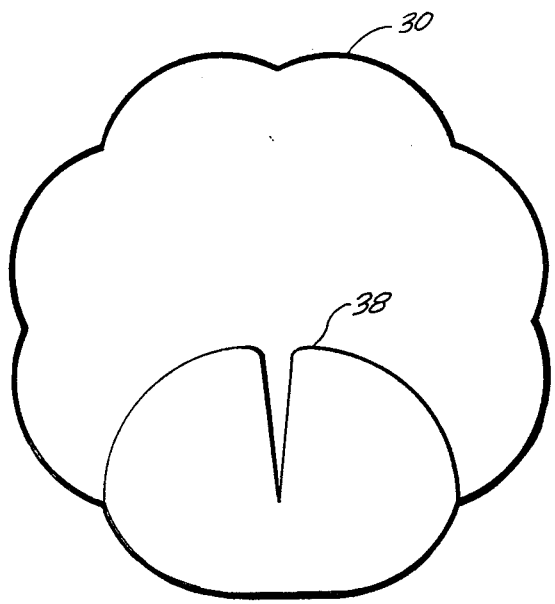
FIG. 3A is a sectional view taken along line 3A—3A of FIG. 1.

FIG. 3A is a sectional view taken along line 3A—3A of FIG. 1 showing the cross-section through one side of envelope 30 and ballonet 38.

FIG. 4 is a diagrammatic view of one side of the helicopter rotor 14 with its gearbox. The deflection of the rotor is shown by phantom lines indicating that the rotor will droop a maximum of three feet at its outside tip when at rest and will raise to a maximum of seven and one-half feet above the horizontal during operation. The circular opening 27 must, of course, provide sufficient clearance for this deflection.

It is comtemplated that this vehicle may be fairly readily disassembled and moved from one working location to another by truck. The keel structure 25, 26 consists of the circular truss 26 to which is fastened fore and aft triangular plan form trusses. The envelope units 28 and 30 are laced to the keel 25, 26 and the Kevlar ropes 33, 33a, 35, 35a attached. The envelopes 28 and 30 are then laced together at the center. The radial truss arms 24 which are detachably fastened to the circular keel truss 26 are preferably designed to swing alongside the frame 10 for transporting.

A second embodiment of our invention is shown in FIGS. 5 and 6 which depict a much larger lifting vehicle capable of carrying payloads in the order of 50 tons. This vehicle is based on the use of two heavy duty lifting systems such as the Sikorski S-64, each currently capable of a total lift of approximately 47,000 pounds. These lifting systems include rotor and gearbox units 70 and 72 driven by gas turbine engines 74 and 76, respectively, which are carried in an elongated frame structure 78. A separate gas turbine engine 80 provides the power to drive the gimbaled forward driving propellers, one of which, 82, is shown in FIG. 6. Engine 76 also drives the yaw control and torque-compensating propeller 84.

The envelope structure for the twin rotor vehicle preferably includes three sections, two of which are triangular sections 86 and 88, which are much like sections 28 and 30 described above with respect to FIGS. 1, 2 and 3 and which include similar ballonet units, not shown, which perform the same functions as described above. The third section 90 is a center section located between the rotors. These sections are laced together along lines 92 and 94 and are also laced to a keel structure consisting of two circular sections 96 and 98, triangular end sections 100 and 102, and intermediate straight side sections 104 and 106. Suitable lifting ropes 108, 108a are anchored at a common point at the top of envelope 88 and extend downwardly through an equatorial fabric member 110 to fasten to the keel. Similar ropes 112, 112a are fastened to envelope section 86 and pass through an equatorial fabric member 114 for attachment to the keel. Tiedown ropes and mounts similar to those shown at numerals 42 and 44 of FIG. 1 and 2 are not shown but may be incorporated as required.

Because of the substantial weight and size of the vehicle, two pairs of castering wheels 116, 118 are used and are fastened to truss members 120 and 122, respectively (FIG. 6). The opposite member of each pair of wheels and the corresponding truss members are on the opposite side of the vehicle, but these are not shown on FIG. 5 because of the reduced scale. Truss members 120 and 122 and the remaining truss members are on the opposite side of the vehicle, but these are not shown on FIG. 5 because of the reduced scale. Truss members 120 and 122 and the remaining truss members fasten the frame 78 to the keel structure and are preferably removably attached to the keel so that the truss members may swing against the side of the frame 78 when the keel and envelope structure are detached.

Carried at the forward part of the frame 78 is a pilot's or operator's cabin 124 which is positioned over a pneumatic bag or pad 126 which supports the forward end of the vehicle when on the ground. An anchoring cone 128 is positioned immediately ahead of the pilot's cabin, and this cone is reeled in and out for landing by means of a hoist located in a housing 130 over the pilot's cabin. Operation of the hoist and the anchoring cone is essentially as described above. Also shown in FIG. 6 are a pair of fuel tanks 132, 134. Not shown are blower members similar to blowers 39 and 41 of FIG. 2 which are used to control attitude of the vehicle through inflating and deflating of the ballonet structure as described above. The blowers are preferably hydrostatically driven by means of gas turbine engine 80.

Operation of the larger vehicle shown in FIGS. 5 and 6 is essentially the same as described above. Again the propellers 82, propeller 84 and the rotors 70 and 72 all preferably include variable pitch control means. The presence of the two rotors 70 and 72 provide the possibility, in addition to the ballonet inflation control means and the gimbaled propellers 82, for effecting somewhat more effective pitch control than that described with respect to the single rotor design.

The lift vehicles of the configuration described herein, both single rotor and twin rotor types, have a major advantage in operational use in that both are capable of high dynamic lift. The air transport vehicle of this description, having a large plan area of the envelope of a shape favorable to higher lift coefficient than a circular hull, is capable of lifting actually more than the capability of the dynamic lift rotor or rotors. The dynamic lift of this nature is derived from the forward motion due to inclination of the hull in a positive angle of attack. This lift diminishes the forward speed, and at low speeds of running it will not be very great, but it will certainly be helpful in cases of overload which may be expected to occur frequently. The angles of incidence at which these dynamic lifts are practiced are small and acceptable to the operating mode of these vehicles.

The yaw, pitch and steering control are of particular interest as applied to these lifting vehicles. These control functions are accomplished by direct power instead of by movable control surfaces functioning under derived power. There are no fixed control surfaces because at low forward speeds these surfaces are barely effective and for this reason would have to be large, heavy and cumbersome. As stated above, the yaw control is preferably accomplished by the control of the pitch of the torque-compensating propeller, reducing the pitch for port directional control and increasing the pitch for starboard directional control, for example.

The vehicle pitch control is accomplished by the forward-driving propellers which, as set forth above, will normally be powered by means of gearboxes driven from a common driving power plant. In large vehicles it may be advantageous that each propeller have its own individual power plant. Both propellers are gimbaled in the elevation plane with sufficient angular swing upward and downward to cause the slipstreams of the propellers to exert a control moment about the center of buoyancy, causing the bow to either rise or drop as long as the angular attitude of the driving propellers is directing their slipstream either downward or upward, as the case may be. The propellers are located forward of the center of buoyancy.

In horizontal flight, the driving propellers exert a moment upward on the hull of the vehicle; it is a positive moment due to their location below the center of buoyancy. It opposes a small negative moment of the hull in forward flight. The axes of rotation of the propellers will normally not be strictly horizontal in a normal horizontal flight, but will be tilted to a small angle with respect to the horizontal plane, which angle will vary somewhat with changing speed of the vehicle. This angle will be so small as to be not noticeable, at least to the casual observer. The small angle of elevation of the driving propellers in flight has a cosine influence on the thrust end, therefore, a very small effect on the propulsion power.

An additional embodiment is shown in FIG. 7 which is in essentially all respects like that shown in FIGS. 1, 2 and 3 except that, as shown in plan view, it will be seen that the outline of the keel and envelope structure, rather than being a rounded diamond shape, is that of an ellipsoid. All members which are the same as those in the FIG. 1, 2 and 3 embodiment have been given the same numerals with primes. Thus, the main frame 10' is shown supporting a rotor structure 14'. Located at the sides of frame 10' are a pair of forward driving propellers 16' and 18' driven from gearboxes 20' and 22' which, in turn, may be driven from a second prime mover (not shown) carried in frame 10'. Extending radially outwardly and upwardly are a plurality of truss members 24' which are attached to and support a keel 140. This keel includes a central circular truss member 26' and fore and aft truss members 142 and 144 which have arcuate sides coming together at the front and rear such that the entire keel has a generally ellipsoidal configuration. The keel supports envelope members 146 and 148 which also have curved sides such that, as laced together at line 149, they define a central duct 150, and the entire outline of the envelope structure is ellipsoidal. The envelope members 146 and 150 are also based on the Forlanini envelope with multi-lobed sections, each of relatively small radius for greater rigidity as described above. Similar ballonet members are incorporated into envelope members 146 and 148, but are not shown because of the reduced scale. Also not shown are the lifting ropes which will also be essentially similar to those shown in FIGS. 1 and 2.

Certain advantages are inherent in the ellipsoidal configuration of FIG. 7. Aerodynamically the envelope construction has less drag than the configuration of FIGS. 1 and 2, and the yaw stability is somewhat greater. With the rounded sides, more gas volume is contained within a given length and width of vehicle. A certain vibration tends to occur with airships of this type due to separation in boundary layers at the aft portion of the hull, and this problem is also minimized with the ellipsoidal envelope structure.

Modifications will occur to those skilled in the art. Obviously, the ellipsoidal configuration is also adaptable to the double rotor arrangement of FIGS. 6 and 7. Should more positive roll control be desirable, this may be effected by cross-controlling the gimbaled forward-facing propellers such that one directs air up while the other directs air downward. Another method of providing roll control would be through the inclusion of horizontal control surfaces of modest size directly behind the forward-driving propellers which can also be controlled to deflect air in opposite directions. Where hydrostatic drive means have been described, it will be clear that direct mechanical drives may also be used and may, in some applications, be preferable.

We claim:
1. A lifting air vehicle comprising in combination:
   rotor means,
   power means connected to drive said rotor means,
   a keel structure including a circular truss coaxial with said rotor means and additional truss members forming triangular sections forward and aft of said circular truss,
   a frame and radial truss arms fastening said frame to said keel structure, said frame carrying and supporting a pilot's cabin, auxiliary power means, said power means for driving said rotor means and propeller means for providing torque compensation to said rotor means and for yaw control,
   port and starboard forward driving propellers attached to said frame driven by said auxiliary power means,
   landing gear means carried on said radial truss arms and an inflatable pad attached to said frame for supporting said vehicle when on the ground,
   and an inflatable envelope structure including first and second generally triangular members secured to said keel structure at the front and back of said vehicle, said members being fastened together at the center of the vehicle to define a large center opening above said rotor means.

2. A lifting air vehicle as set forth in claim 1 wherein internal ropes are provided attached between the top of said triangular envelope members and said keel for resisting inflation pressures in said envelope members.

3. A lifting air vehicle as set forth in claim 2 wherein other internal ropes are provided for partially transferring lift forces from said triangular envelope means to said keel structure.

4. A lifting air vehicle as set forth in claim 1 wherein said frame extends fore and aft diametrally.

5. A lifting air vehicle as set forth in claim 1 wherein said frame extends fore and aft diametrally across said center opening below said keel structure.

6. A lifting air vehicle as set forth in claim 1 wherein said port and starboard forward driving propellers are gimbaled in the elevational plane for elevational control.

7. A lifting air vehicle as set forth in claim 1 wherein said forward driving propellers are driven by said auxiliary power means.

8. A lifting air vehicle as set forth in claim 1 wherein said forward driving propeller means include the variable pitch control means.

9. A lifting air vehicle as set forth in claim 1 wherein said power means comprises a twin gas turbine engine with the capability of driving said rotor means with either one or both engines.

10. A lifting air vehicle as set forth in claim 1 wherein said rotor means comprises two lift rotor units, said keel includes two circular truss members with longitudinal truss members extending between said triangular truss members, said power means includes a separate engine unit driving each of said lift rotor units, and said inflatable envelope structure includes a third inflatable member cooperating with said first and second generally triangular envelope members to define two large center openings, each of which is above and generally coaxial with one of said lift rotor units.

11. A lifting air vehicle as set forth in claim 1 wherein said frame carries a landing cone, a cable attached to said landing cone, and a winch for driving said cable is secured to said frame.

12. A lifting air vehicle as set forth in claim 1 wherein the envelope structure comprises the Forlanini type of envelope wherein the side walls include a plurality of lobes of relatively small radius.

13. A lifting air vehicle as set forth in claim 1 wherein said additional truss members are bowed outwardly and said first and second generally triangular inflatable members also have their side walls bowed outwardly such that said vehicle has a generally ellipsoidal configuration.

14. A lifting air vehicle as set forth in claim 13 wherein the envelope structure comprises the Forlanini type of envelope wherein the side walls include a plurality of lobes of relatively small radius.

* * * * *